United States Patent
Mizuki et al.

(10) Patent No.: US 7,860,048 B2
(45) Date of Patent: Dec. 28, 2010

(54) MOBILE TERMINAL, RESOURCE ALLOCATION MANAGER, AND COMMUNICATION CONTROL METHOD

(75) Inventors: Atsushi Mizuki, Yokohama (JP); Hiroshi Kawakami, Yokosuka (JP); Wataru Takita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 899 days.

(21) Appl. No.: 11/674,863

(22) Filed: Feb. 14, 2007

(65) Prior Publication Data
US 2007/0195745 A1 Aug. 23, 2007

(30) Foreign Application Priority Data
Feb. 15, 2006 (JP) ............................ P2006-038520

(51) Int. Cl.
*H04W 4/00* (2009.01)
(52) U.S. Cl. ...................................... 370/328; 370/338
(58) Field of Classification Search ................ 455/557, 455/73; 370/328, 338
See application file for complete search history.

(56) References Cited

U.S. PATENT DOCUMENTS

| | | | |
|---|---|---|---|
| 6,349,205 B1 | 2/2002 | Fang et al. | |
| 7,162,236 B2* | 1/2007 | Dorenbosch et al. | 455/432.1 |
| 7,251,488 B2* | 7/2007 | Chitrapu | 455/436 |
| 7,496,360 B2* | 2/2009 | Sindhwani et al. | 455/422.1 |
| 7,610,014 B2* | 10/2009 | Buckley | 455/41.2 |
| 2003/0119489 A1 | 6/2003 | Mohammed | |
| 2004/0192211 A1* | 9/2004 | Gallagher et al. | 455/67.11 |
| 2005/0064896 A1* | 3/2005 | Rautiola et al. | 455/553.1 |
| 2005/0085258 A1* | 4/2005 | Ishii et al. | 455/552.1 |
| 2006/0089169 A1* | 4/2006 | Tsao et al. | 455/552.1 |
| 2008/0002605 A1* | 1/2008 | Todd et al. | 370/328 |

FOREIGN PATENT DOCUMENTS

| | | |
|---|---|---|
| JP | 2005-176021 | 6/2005 |
| JP | 2005-277815 | 10/2005 |
| JP | 2006-197079 | 7/2006 |
| KR | 2002-0065469 | 8/2002 |
| KR | 2003-0000650 | 1/2003 |
| WO | WO 02/05576 A2 | 1/2002 |
| WO | WO 2005/125258 A1 | 12/2005 |

* cited by examiner

*Primary Examiner*—Lester Kincaid
*Assistant Examiner*—Nathan Mitchell
(74) *Attorney, Agent, or Firm*—Oblon, Spivak, McClelland, Maier & Neustadt, L.L.P.

(57) ABSTRACT

The present invention provides a mobile terminal, resource allocation manager and communication control method for sustaining the standby time to a time equivalent to the standby time of a communication device in which only a single radio interface is activated, without missing an opportunity of radio communication under good communication conditions.

A mobile terminal 1 comprises a first communication section 101, a second communication section 102, a receiving activation section 103 for activating a second receiving function for the second communication section 102 as a result that the first information is received by the first communication section 101, an information transmission section 104 for sending terminal identification data of the mobile terminal 1 as a result that the second receiving function is started up by the receiving activation section 103, and a switching request section 105 for selecting the first communication section 101 or the second communication section 102 as a communication section for receiving information sent by the radio communication station which received the terminal identification data from the information transmission section 104, based on the terminal identification data, and switching a receiving function to be activated.

9 Claims, 14 Drawing Sheets

Fig.4

| COMMUNICATION STATION MANAGEMENT TABLE | | 41a |
|---|---|---|
| RADIO COMMUNICATION STATION | MAC ADDRESS | |
| FIRST RADIO COMMUNICATION STATION | 00:00:00:00:00:01 | |
| SECOND RADIO COMMUNICATION STATION | 00:00:00:00:00:02 | |
| THIRD RADIO COMMUNICATION STATION | 00:00:00:00:00:03 | |
| ... | ... | |
| ... | ... | |

MOBILE TERMINAL, RESOURCE ALLOCATION MANAGER, AND COMMUNICATION CONTROL METHOD

BACKGROUND OF THE INVENTION

1. Field of the Invention

The present invention relates to a mobile terminal which can connect and communicate with a plurality of different types of radio communication stations, a resource allocation manager for switching radio communication stations which connect and communicate with a mobile terminal and manage the allocation of the resource, and a communication control method for controlling connection and communication with a mobile terminal and a plurality of different types of radio communication stations.

2. Related Background Art

Recently there are radio communication spots where a plurality of radio communication networks, such as a cellular network (that is a cellular telephone communication network) and a radio LAN network (that is a radio LAN communication network), are overlapped and allocated to a same area. For Such a radio communication spot, technologies for a mobile terminal having interfaces which can connect and communicate with each radio communication station of the plurality of radio communication networks to switch the interface to use according to the surrounding communication conditions have been proposed or commercialized.

In the case of an access network selection method disclosed in Japanese Patent Application Laid-Open No. 2005-277815, for example, a mobile information terminal that can connect and communicate with a plurality of communication networks detects the deterioration of the receiving status of another communication network during communication, and controls such as switching to another communication network so as to continue the communication if the receiving status of the accessing communication network deteriorates Another example is an information processing device disclosed in Japanese Patent Application Laid-open No. 2005-176021, which selects a communication profile to be used for a radio LAN based on the surrounding communication conditions, and automatically switches to the best communication environment under the communication status desired by the user.

Another example is a service called "BT Fusion®", provided by BT in the United Kingdom, to meet the increasing demand for communication using a fixed telephone network of which the communication charge is cheaper than a cellular network This service allows a mobile terminal accessing a cellular network outdoors, such as outside the home, to use a fixed telephone network indoors, such as at home, by switching access to the fixed telephone network using Bluetooth®.

Today bidirectional real-time communication, such as voice communication and TV telephone, using not a cellular network but a communication network such as a radio LAN network, is actively performed This real-time communication, using a radio LAN network and so on, is implemented by the improvement of VoIP (Voice over Internet Protocol) technology.

In this case, a mobile terminal having a plurality of radio interfaces, which can connect and communicate with a cellular network and a radio LAN network, requires high power consumption during standby time compared with a mobile terminal having a single radio interface For example, in "N900iL", which is one FOMA® model of third generation portable telephone terminals, a continuous standby time in FOMA single mode (that is, a mode in which only FOMA is activated and used during standby time) is approximately 350 hours in static time, but in DUAL mode (that is, a mode in which both FOMA and radio LAN are activated and used during standby time), a continuous standby time is approximately 150 hours in static time, which is much shorter.

SUMMARY OF THE INVENTION

In the above mentioned access network selection method, a detector for detecting the radio status (receiving field strength) is equipped in the mobile information terminal for detecting the deterioration of the receiving status of another communication network when the mobile information terminal is communicating. Furthermore, to detect the radio status of a communication station of the communication network, this detector must always be activated to ON status.

However the number of radio communication spots where a plurality of communication networks are overlapped and allocated to a same area is very small. Therefore it is a waste for a mobile terminal having a plurality of interfaces (e.g. the above mentioned "N900iL") to activate all the plurality of interfaces during standby for receiving data, in terms of the length of continuous standby time (that is, the quantity of power consumption). So a user of a mobile terminal tends to deactivate the radio interfaces which can connect and communicate with a radio LAN network, and set the mobile terminal in operation deactivated status (e.g. the above mentioned FOMA single mode).

If the radio interface which can connect and communicate with the radio LAN network is deactivated, the user of this mobile terminal cannot recognize that the connection and communication with the radio LAN network is possible even if the user is in the above mentioned radio communication spot. As a result, even if the communication conditions are better in communication connection with the radio LAN network than communication connection with the cellular network the user of the mobile terminal cannot communicate under these good communication conditions, and may miss the opportunity of radio communication under good communication conditions.

As described above, the length of continuous standby time and the possibility of performing radio communication under good communication conditions are in a trade-off relationship, and it is difficult to implement both with the above mentioned prior art.

With the foregoing in view, it is an object of the present invention to provide a mobile terminal, resource allocation manager and communication method for solving the above problems, and sustaining the standby time to a time equivalent to the standby time of a communication device in which only a single radio interface is activated, without missing an opportunity of radio communication under good communication conditions.

The mobile terminal of the present invention is a mobile terminal which can connect and communication with a plurality of different types of radio communication stations, comprising: first receiving means for enabling receiving of a first information from a first radio communication station when a first receiving function for receiving the first information is activated, and disabling receiving of the first information when the first receiving function is deactivated; second receiving means for enabling receiving of a second information when a second receiving function for receiving the second information from a second radio communication station is activated, and disabling receiving of the second information when the second receiving function is deactivated; receiving activation means for activating the second receiving function of the second receiving means as a result that the first information is received by the first receiving means; information transmission means for transmitting terminal identification data of the mobile terminal to a radio communication station which can connect and communicate with the mobile terminal as a result that the second receiving function is activated by the receiving activation means; and switching request means for selecting the first or second receiving means as receiving means for receiving information transmitted from a radio communication station which has received the terminal identification data by the information transmission means based on the terminal identification data, and switching a receiving function to be activated.

According to the mobile terminal of the present invention, the second receiving function of the second receiving means is activated by the receiving activation means when the first information is received by the first receiving means. Then when the second receiving function is activated by the receiving activation means, the information transmission means sends the terminal identification data of the local terminal to a radio communication station, which can connect and communicate with the local terminal. And the switching request means selects the first or second receiving means as the receiving means for receiving information transmitted by the radio communication station which received the terminal identification data from the information transmission means based on the terminal identification data and a receiving function to be activated is switched. Therefore the second receiving function of the second receiving means is also activated first, and then the first or second receiving means is selected based on the terminal identification data and a receiving function to be activated is switched, so the opportunity of radio communication under good communication conditions is not missed. Only the first receiving means or the first or second receiving means of which receiving function to be activated is switched by the switching request means is in a status where the receiving function is activated before and after the first information is received by the first receiving means, so the standby time of the mobile terminal can be sustained to a time equivalent to the standby time of a communication device in which only a single radio interface is activated.

It is preferable that the information transmission means inquires of the second radio communication station about communication station identification data of the second radio communication station as a result that the second receiving function is activated by the receiving activation means, selects the first or second radio communication station as a radio communication station which can connect and communicate with the mobile terminal based on the inquired communication station identification data, and sends the terminal identification data.

By this, the information transmission means selects the first or second radio communication station as a radio communication station which can connect and communicate with the local terminal based on the communication station identification data inquired by the information transmission means, and sends the terminal identification data. Since a radio communication station which can connect and communicate with the local terminal is selected and the terminal identification data is sent to this radio communication station, an opportunity of radio communication under good communication conditions is not missed with more certainty.

The resource allocation manager of the present invention is a resource allocation manager for switching a radio communication station which connects and communicates with the above mentioned mobile terminal and managing the allocation of resources, comprising: information receiving means for receiving the terminal identification data from the radio communication station as a result that the information transmission means sends the terminal identification data to a radio communication station which can connect and communicate with the mobile terminal; and selection switching means for selecting and switching the first or second radio communication station as a radio communication station which connects and communicates with the mobile terminal based on the terminal identification data received by the information receiving means.

According to the resource allocation manager of the present invention, the selection switching means selects and switches the first or the second radio communication station as a radio communication station which connects and communicates with the mobile terminal based on the terminal identification data received by the information receiving means. By this, an opportunity of radio communication under good communication conditions is not missed with more certainty.

It is preferable that the resource allocation manager further comprises status inquiry means for inquiring of each of the first and second radio communication stations about the communication status after the terminal identification data is received by the information receiving means, wherein the selection switching means selects and switches the first or second radio communication station as a radio communication station which connects and communicates with the mobile terminal based on a comparison result of the communication status inquired by the status inquiry means and the terminal identification data received by the information receiving means.

By this, the selection switching means selects and switches the first or second radio communication stations as a radio communication station which connects and communicates with the mobile terminal based on the comparison result of the communication status inquired by the status inquiry means and terminal identification data received by the information receiving means. As a result, an opportunity of radio communication under good communication conditions, including good communication status, is not missed with more certainty.

The communication control method of the present invention is a communication control method for controlling the communication connection between a mobile terminal, which comprises first receiving means for enabling receiving of a first information when a first receiving function for receiving the first information from a first radio communication status is activated and disabling receiving of a first information when the first receiving function is deactivated, and second receiving means for enabling receiving of a second information when a second receiving function for receiving the second information from a second radio communication station is activated and disabling receiving of the second information when the second receiving function is deactivated, and a plurality of different types of radio communication stations, the method comprising: a receiving activation step of activating the second receiving function of the second receiving means as a result that the first information is received by the first receiving means of the mobile terminal; an information transmission step of transmitting terminal identification data of the mobile terminal to a radio communication station which can connect and communicate with the mobile terminal as a result that the second receiving function is activated by the receiving activation step; and a switching request step of selecting the first or second receiving means as receiving means for receiving information transmitted by a radio communication station which received the terminal identification data in the information transmission step based on the terminal identification data and switching the receiving function to be started up.

According to the communication control method of the present invention, the second receiving function of the second receiving means is activated in the receiving activation step when the first information is received by the first receiving means of the mobile terminal. Then when the second receiving function is activated in the receiving activation step, the terminal identification data of the mobile terminal is sent to a radio communication station which can connect and communicate with the mobile terminal in the information transmission step. And the first or second receiving means is selected based on the terminal identification data in the switching request step, as the receiving means for receiving information sent by the radio communication station which received the terminal identification data in the information transmission step, and the receiving function to be activated is switched. Therefore after the second receiving function of the second receiving means is also activated first, the first or second receiving means is selected based on the terminal identification data and a receiving function to be activated is switched, so an opportunity for radio communication under good communication conditions is not missed. Only the fist receiving means or the first or second receiving means of which receiving function to be activated is switched in the switching request step is in a status where the receiving function is activated before and after the first information is received by the first receiving means, so the standby timing of this mobile terminal can be sustained to a time equivalent to the standby time of a communication device in which only a single radio interface is activated.

It is also preferable that the information transmission step inquires of the second radio communication station about communication station identification data of the second radio communication station as a result that the second receiving function is activated in the receiving activation step, the first or second radio communication station is selected as a radio communication station which can connect and communicate with the mobile terminal based on the inquired communication station identification data, and the terminal identification data is sent.

By this, the first or second radio communication station is selected as a radio communication station which can connect and communicate with the mobile terminal in the information transmission step based on the communication station identification data inquired in the information transmission step, and the terminal identification data is sent. Since a radio communication station which can connect and communicate with the mobile terminal is selected and the terminal identification data is sent to this radio communication station, an opportunity of radio communication under good communication conditions is not missed with more certainty.

It is also preferable that the communication control method further comprises a voice call enabling step of leading the mobile terminal to be in a call enabled status enabling a voice call using the mobile terminal after the second receiving function of the second receiving means is activated in the receiving activation step, and a call continuation enabling step for continuing the call enabled status in the voice call enabling step even after the first or second receiving means is selected and a receiving function to be activated is switched in the switching request step.

By this, even after the second receiving function of the second receiving means is activated in the receiving activation step, the call enabled status, where a voice call using the mobile terminal is enabled, occurs in the voice call enabling step. As a result, time from receiving the first information by the first receiving means of the mobile terminal to entering the call enabled status can be decreased. Also even after the receiving function to be started up is switched by selecting the first or second receiving means in the switching request step, the call enabled status can be continued in the call continuation enabling step. As a result, an opportunity of continuing a voice call in good communication conditions is not missed.

According to the present invention, the standby time can be sustained to a time equivalent to the standby time of a communication device in which only a single radio interface is activated, without missing an opportunity of radio communication under good communication conditions.

BRIEF DESCRIPTION OF THE DRAWINGS

FIG. 4 shows a table configuration of the communication station management table;

DESCRIPTION OF THE PREFERRED EMBODIMENTS

Embodiments of the present invention will now be described with reference to the accompanying drawings. In the descriptions of the drawings, the same components are denoted with the same reference symbols, where redundant description is omitted.

First Embodiment

Figure 1:
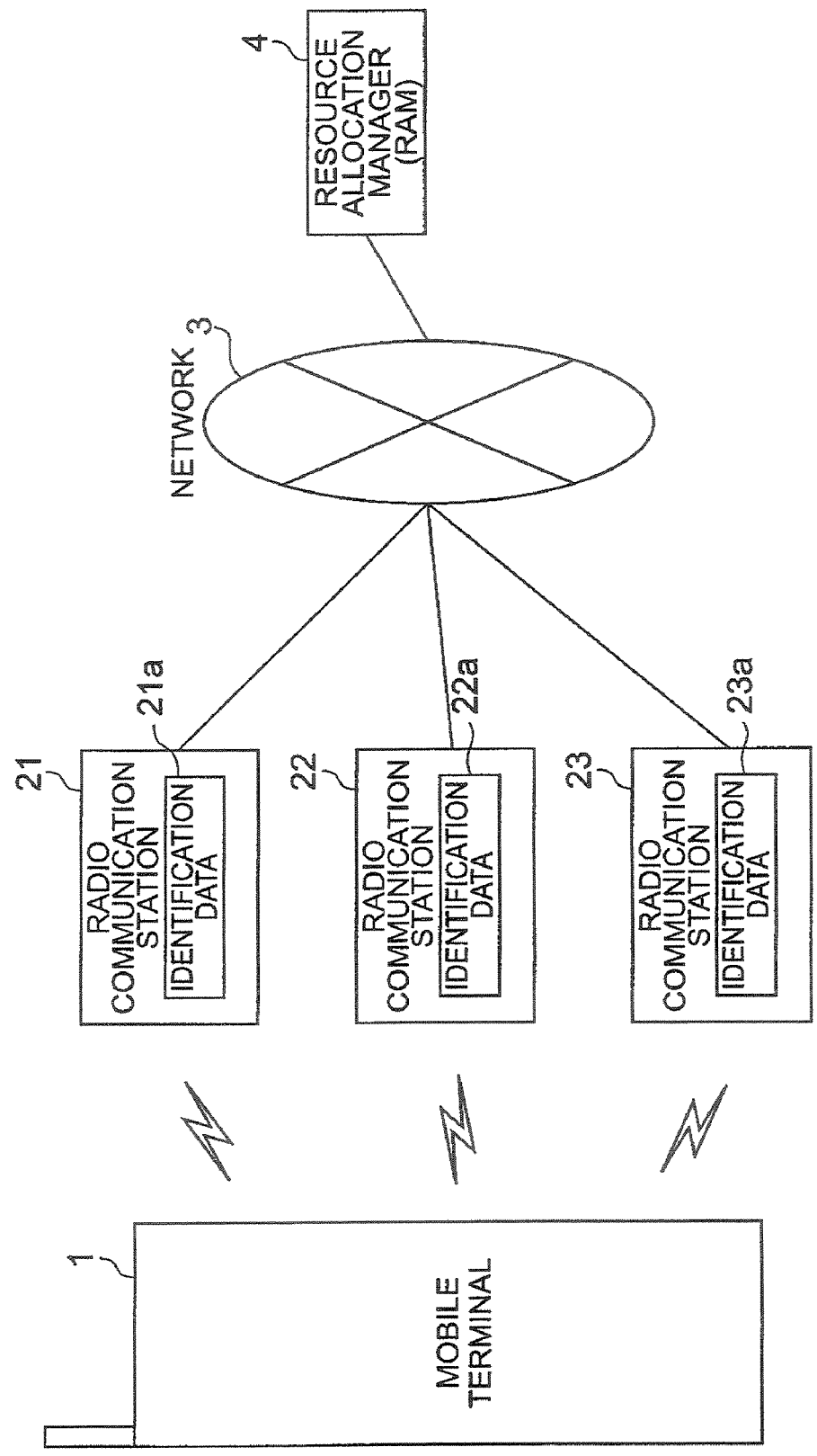
FIG. 1 is a block diagram showing the configuration of the communication control system.

First a configuration of the communication control system, including a mobile terminal 1 and a resource allocation manager 4 according to the first embodiment of the present invention, will be described with reference to FIG. 1. FIG. 1 is a system block diagram showing the configuration of the communication control system. The communication control system comprises a mobile terminal 1, radio communication stations 21-23, communication network 3, and resource allocation manager 4. The mobile terminal 1 is a terminal which can connect and communicate with a plurality of different types of radio communication stations 21-23, and is a portable communication terminal, such as a portable telephone terminal and PDA, for example Each of the three radio communication stations 21-23 connects and communicates with the communication network 3. The number of radio communication stations is any number as long as it is plural. The resource allocation manager 4 also connects and communicates with the communication network 3. The resource allocation manager 4 is a device, such as a server, for managing the allocation of resources by switching the radio communication stations 21-23 to connect and communicate with the mobile terminal 1.

Each of the radio communication stations 21-23 is a communication station which can connect and communicate with the mobile terminal 1 by radio communication, and is a base station which connects and communicates with the mobile communication network, or a radio communication spot which connects and communicates with a radio LAN network, for example. The radio communication station 21 has identification data 21*a* (communication station identification data) for uniquely identifying the local station. In the same way, the radio communication station 22 has identification data 22*a*, and the radio communication station 23 has identification data 23*a*.

The communication network 3 is a communication network which can connect and communicate with the radio communication stations 21-23 and the resource allocation manager 4. The communication network 3 is a communication network, including the entirety of the Internet, intranet, mobile communication network and radio LAN network.

Figure 2:
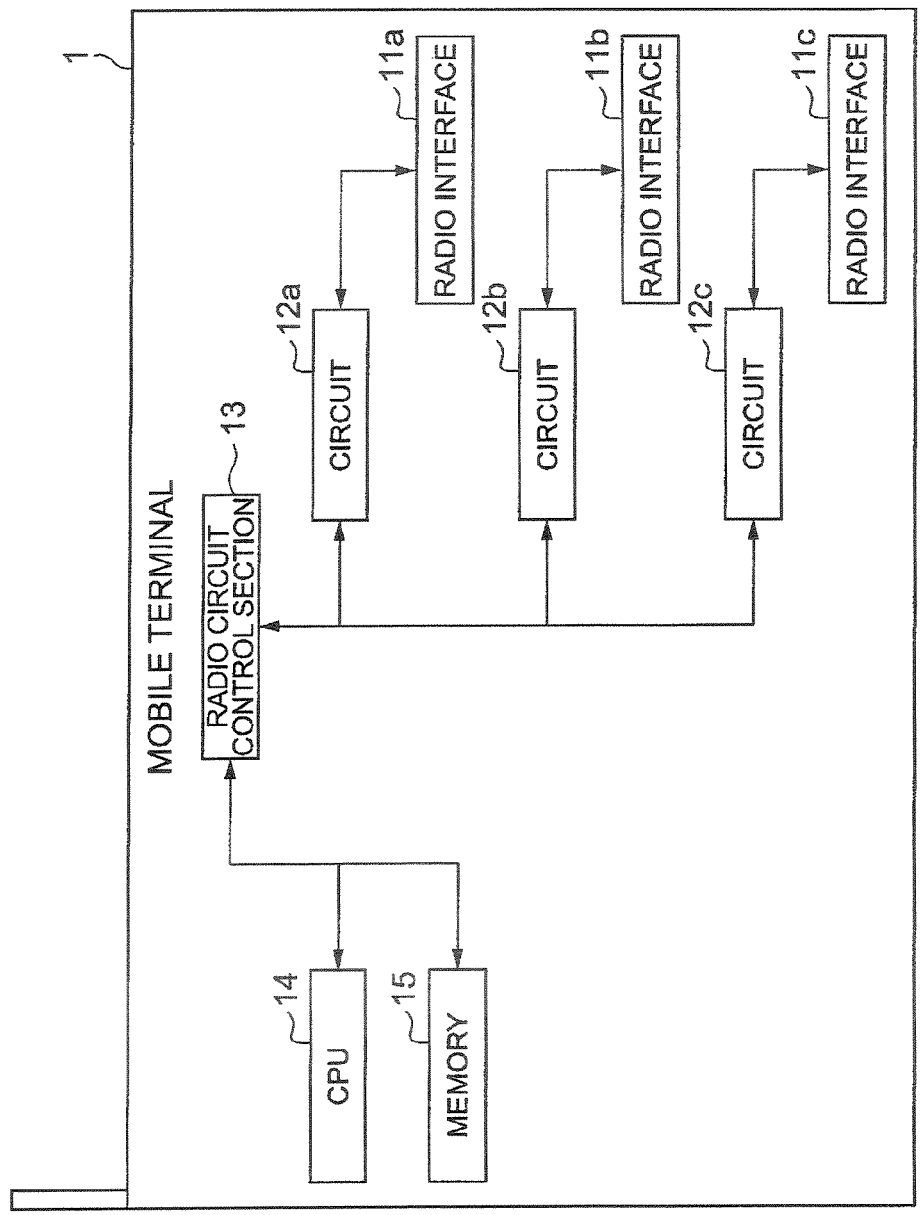
FIG. 2 is a hardware block diagram showing the physical components of the mobile terminal.

Now the physical components of the mobile terminal 1 will be described with reference to FIG. 2. FIG. 2 is a hardware block diagram showing the physical components of the mobile terminal 1. As FIG. 2 shows, the mobile terminal 1 is a portable telephone, comprising radio interfaces 11*a*-11*c*, circuits 12*a*-12*c*, radio circuit control section 13, CPU (Central Processing Unit) 14, memory 15, such as RAM and ROM, an operation section (not illustrated) such as ten keys, and a display (not illustrated) for displaying the status of the local terminal for the user of the mobile terminal 1, as the physical components. The radio interface 11*a* is connected to the radio circuit control section 13 via the circuit 12*a*. In the same way, the radio interface 11*b* is connected to the radio circuit control section 13 via the circuit 12*b*, and the radio interface 11*c* is connected with the radio circuit control section 13 via the circuit 12*c*. The CPU 14 and memory 15 are connected with the radio circuit control section 13 respectively.

Here the radio interface 11*a* is an interface to connect and communicate with the radio communication station 21 by radio communication (e.g. communication equipment such as a radio communication module, radio LAN card, Bluetooth® support card, infrared communication support card) In the same way, the radio interface 11*b* is an interface to connect and communicate with the radio communication station 22 by radio communication, and the radio interface 11*c* is an interface to connect and communicate with the radio communication station 23 by radio communication. The number of radio interfaces is any number as long as it is plural. The radio circuit control section 13 is a section for controlling the selecting and switching of a radio interface (that is radio communication station) connecting and communicating with the mobile terminal 1. The CPU 14 is a processing unit for performing the computing processing of programs and so on, and the memory 15 is a storage device for storing the calculated result of the program and so on.

Figure 3:
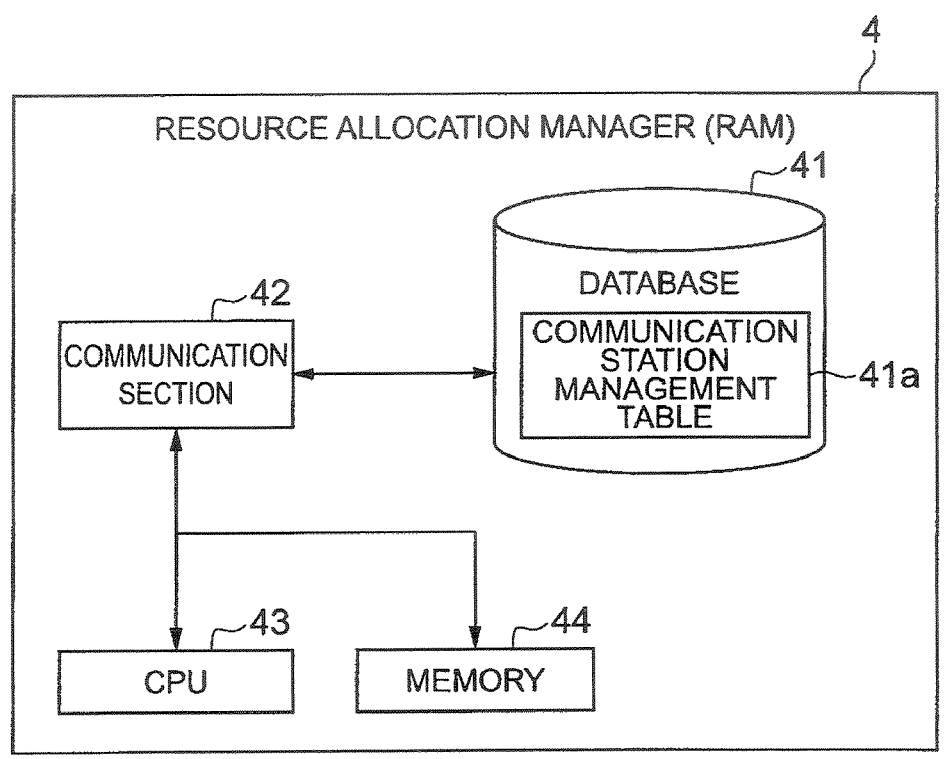
FIG. 3 is a hardware block diagram showing the physical components of the resource allocation manager.

Now the physical components of the resource allocation manager 4 (RAM) will be described with reference to FIG. 3. FIG. 3 is a hardware block diagram showing the physical components of the resource allocation manager 4. As FIG. 3 shows, the resource allocation manager 4 is a server comprising a database 41, communication section 42, CPU 43 and memory 44 as the physical components. The database 41 is connected with the communication section 42. Furthermore, the CPU 43 and the memory 44 are connected with the communication section 42 respectively.

Here the database 41 has a communication station management table 41*a*. This communication station management table 41*a* stores the identification data 21*a* of the radio communication station 21, identification data 22*a* of the radio communication station 22, and identification data 23*a* of the radio communication station 23. The method for storing the identification data will be described in detail later. The communication section 42 is a section for controlling communication with each of the radio communication stations 21-23 via the communication network 3. The CPU 43 is a processing unit for performing the computing processing for programs and so on, and the memory 44 is a storage device for storing the calculated results of a program and so on.

Figure 5:
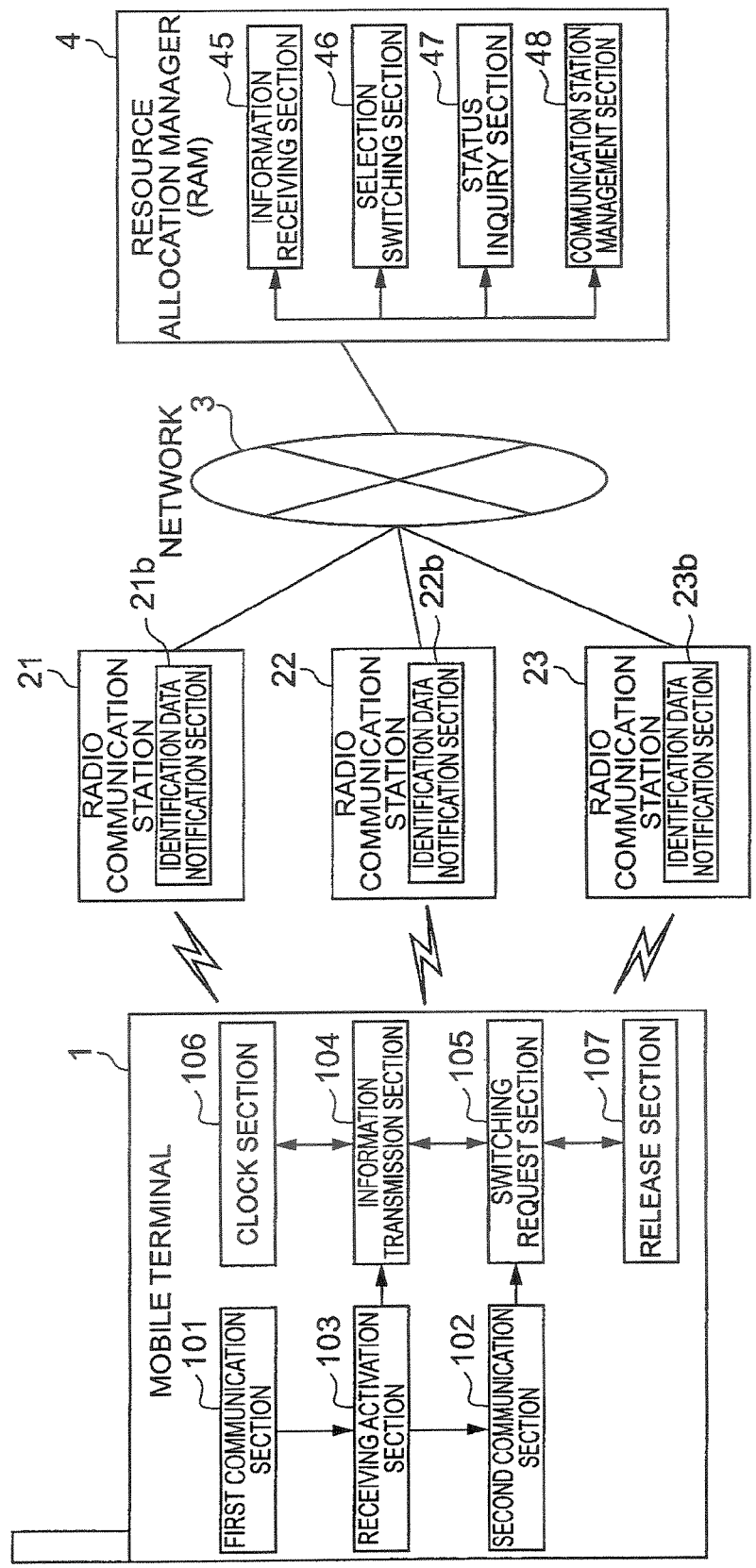
FIG. 5 is a functional block diagram showing the functional components of the communication control system.

Now the functional components of the communication control system, including the mobile terminal 1 and the resource allocation manager 4, will be described with reference to FIG. 5. FIG. 5 is a functional block diagram showing the functional components of the communication control system. Each component shown in FIG. 5 indicates a functional element implemented by the CPU or a program executed by the CPU. First, as FIG. 5 shows, the mobile terminal 1 comprises a first communication section 101 (first receiving means), second communication section 102 (second receiving means), receiving activation section 103 (receiving activation means), information transmission section 104 (information transmission means), switching request section 105 (switching request means), clock section 106 and release section 107. These components are interconnected by internal circuits. Each of these functional components may be physically distributed, and a set of these components may be regarded as the mobile terminal 1.

Here it is assumed that the first communication section 101 corresponds to the radio interface 11*a* in FIG. 2, and the second communication section 102 corresponds to the radio interfaces 11*b* and 11*c* in FIG. 2. Each function of the receiving activation section 103, information transmission section 104, switching request section 105, clock section 106 and release section 107 is implemented by hardware, such as the CPU 14 and memory 15 shown in FIG. 2, reading predetermined computer software so that the radio interfaces 11*a*-11*c* and a display (not illustrated) are operated under control of the CPU 14 and that the data in memory 15 is read and written.

Now each component of the mobile terminal 1 will be described. The first communication section 101 is a communication section having a first receiving function for receiving a first radio information from the first radio communication station 21, and a transmission function for sending radio information to the first radio communication station 21. This first receiving function is enabled to receive the first information in activated status, and is disabled to receive the first information in deactivated status. This first receiving function has been activated and in activated status since before the radio communication station is switched in the mobile terminal 1. The first radio information is information transmitted from the first radio communication station 21, and the contents thereof are not particularly restricted.

The second communication section 102 is a communication section having a second receiving function for receiving a second radio information from the second radio communication section 22, and a transmission function for sending radio information to the second radio communication station 22. This second receiving function is enabled to receive the second information in activated status and is disabled to receive the second information in deactivated status. This second receiving function has been deactivated and in deactivated status since before the radio communication station is switched in the mobile terminal. The second radio information is information transmitted from the second radio communication station 22, and the contents thereof are not particularly restricted.

The receiving activation section 103 is a section for activating the second receiving function of the second communication section 102 when the first information is received by the first communication section 101. This first receiving function has been activated and in activated status since before the radio communication station is switched in the mobile terminal 1, and when the first information is received by the first communication section 101, the second receiving function of the second communication section 102 is also activated. In other words, all the receiving functions of the first receiving function and the second receiving function are activated when the first information is received by the first communication section 101.

The information transmission section 104 sends the terminal identification data of the mobile terminal 1 to a radio communication station which can connect and communicate with the mobile terminal 1 when the second receiving function is activated by the receiving activation section 103. Specifically, the information transmission section 104 inquires the communication station identification data of the radio communication station 22 to the radio communication station 22, for example, when the second receiving function is activated by the receiving activation section 103. Then, based on the inquired communication station identification data, the information transmission section 104 selects the radio communication station 21 or radio communication station 22 as a radio communication station which can connect and communicate with the mobile terminal 1, and sends the terminal identification data to this selected radio communication station. The information transmission section 104 inquires the communication conditions including the communication station identification data by sending an identification data request signal for requesting the communication station identification data to the second radio communication station 22, and by waiting for receiving the communication station identification data from the second radio communication station 22 until the timer by the clock section 106 is up.

The switching request section 105 is a section which selects, based on the terminal identification data, the first communication section 101 or second communication section 102 as a communication section for receiving information sent by the radio communication station which received the terminal identification data from the information transmission section 104, and switches the receiving function to be activated. In other words, the switching request section 105 selects, based on the communication conditions including this terminal identification data, the first communication section 101 or second communication section 102 as a communication section in which the receiving function is activated and switches such that only the receiving function of this selected communication section is activated. The second communication section 102 corresponds to the radio interfaces 11b and 11c in FIG. 2, and when the switching request section 105 selects the second communication section 102, the switching request section 105 further selects whether the communication section is switched to the radio interface 11b or radio interface 11c.

The clock section 106 is a timer which measures a predetermined time T. The predetermined time is a time from when the information transmission section 104 requests the communication station identification data to the second radio communication station 22 to when waiting for receiving this communication station identification data ends, for example.

The release section 107 is a section for deactivating the receiving function of the communication section having a receiving function to receive the radio information from a radio communication station with which communication condition are poor, when the switching request section 105 did not select a communication section, that is when only the radio communication station with which communication conditions are poor could be discovered. Also if the communication station identification data is not received from the second radio communication station 22 before the timer by the clock section 106 is up, the release section 107 deactivates the second receiving function of which receiving function was activated by the receiving activation section 103.

Now the functional components of each radio communication station 21-23 will be described. As FIG. 5 shows, the radio communication station 21 has an identification data notification section 21b for sending and notifying the identification data 21a to the mobile terminal 1 when the communication station identification data is requested by the information transmission section 104. The identification data notification 21b also sends the RAM notification signal including this identification data 21a to the resource allocation manager 4. In the same way, the radio communication station 22 has an identification data notification section 22b, and the radio communication station 23 has an identification data notification section 23b.

Now the functional components of the resource allocation manager 4 will be described. As FIG. 5 shows, the resource allocation manager 4 has an information receiving section 45 (information receiving means), selection switching section 46 (selection switching means), status inquiry section 47 (status inquiry means) and communication station management section 48.

The communication station management section 48 corresponds to the database 41 in FIG. 3. Each function of the information receiving section 45, selection switching section 46 and status inquiry section 47 is implemented by hardware, such as the CPU 43 and the memory 44 as shown in FIG. 3, reading a predetermined computer software so that the communication section 42 is operated under the control of the CPU 43, and data is read and written in the memory 44.

Now each component of the resource allocation manager 4 will be described. The communication station management section 48 is a section for storing the identification data 21a of the radio communication station 21, identification data 22a of the radio communication station 22 and identification data 23a of the radio communication station 23. The storing method for this identification data will be described in detail later.

The information receiving section 45 is a section for receiving the RAM notification signal including the identification data from the radio communication station 21 or the radio communication station 22. When the terminal identification data on a radio communication station which can connect and communicate with the mobile terminal 1 is sent by the information transmission section 104, the information receiving section 45 receives the RAM notification signal including the connection enabling conditions from this communication station.

The selection switching section 46 is a section of selecting and switching the radio communication station 21 or radio communication station 22 as a radio communication station which connects and communicates with the mobile terminal 1 based on the terminal identification data received by the information receiving section 45. The selection switching section 46 also selects and switches the radio communication station 21 or radio communication station 22 as a radio communication station which connects and communicates with the mobile terminal 1 based on the comparison result of the communication status inquired by the later mentioned status inquiry section 47 and the terminal identification data received by the information receiving section 45.

The status inquiry section 47 is a section for inquiring the communication status of each communication station to the first radio communication station 21 and the second radio communication station 22 after the terminal identification data is sent to the radio communication station 21 or the radio communication station 22 by the information transmission section 104. This inquiry of the communication status is performed by the status inquiry section 47 sending the channel information request signal to the radio communication station 21 and the radio communication station 22 respectively. This inquiry will be described in detail later.

Now an example of the storage method for the identification data of the radio communication station will be described with reference to FIG. 4. FIG. 4 shows a table configuration of the communication station management table 41a. In the communication station management table 41a, the identification data 21a for the radio communication station 21, the identification data 22a for the radio communication station 22, and the identification data 23a for the radio communication station 23 are stored. Each of this identification data is, for example, the respective AC address of the radio communication stations as shown in FIG. 4. For example, the MAC address of the radio communication station 21 is stored as "00: 00: 00: 00: 00: 01".

Figure 6:
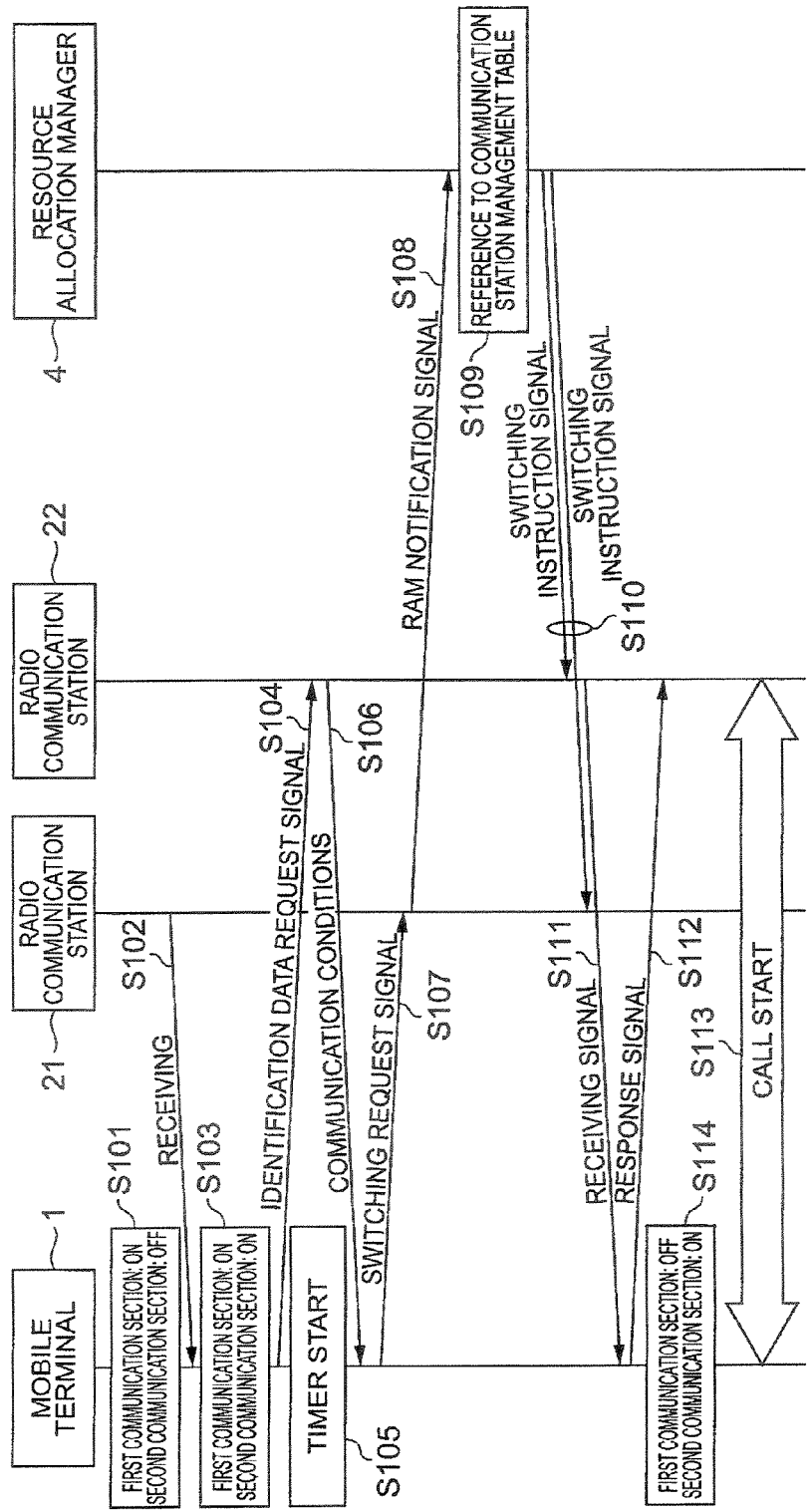
FIG. 6 is a sequence diagram showing an example of the switching operation of the communication section by the communication control system.

Now the radio communication station switching operation by the communication control system will be described with reference to FIG. 6. FIG. 6 is a sequence diagram showing an example of a communication section switching operation by the communication control system. It is assumed that in the mobile terminal 1, the receiving function of the first communication section 101 is only activated (ON) and the receiving function of the other communication section (that is the second communication section 102) is deactivated (OFF) (S101) in the initial condition First the first communication section 101 receives signal from the radio communication section 21 (S102). In other words, the first communication section 101 receives the first information from the radio communication station 21. When this information is received, the receiving function of the second communication section 102 is activated by the receiving activation section 103 (S103, receiving activation step). As a result, all the receiving functions of the mobile terminal 1 are activated.

Figure 7:
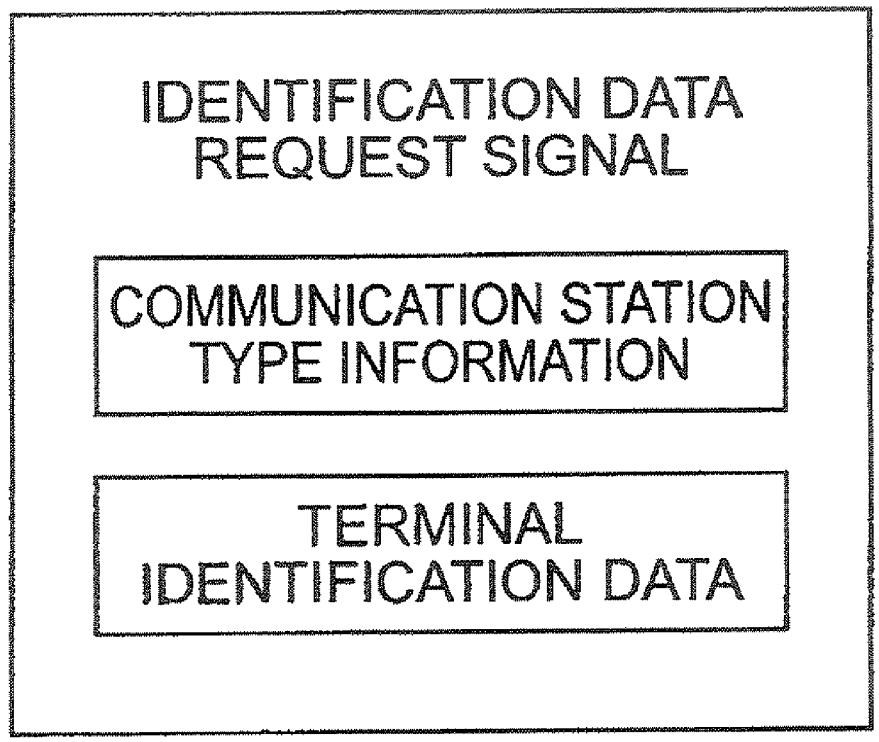
FIG. 7 is a diagram showing the configuration of the identification data request signal.

Then when the receiving function of the second communication section 102 is activated, the identification data request signal is sent to the radio communication section 22 by the information transmission section 104 using the communication function of the second communication section 102 (S104, information transmission step). This signal for inquiring the communication station identification data includes the terminal identification data which can uniquely identify the mobile terminal 1, and the communication station identification data which indicates the type of communication station for which connection and communication with the mobile terminal 1 is requested (see FIG. 7). Immediately after this signal is sent to the radio communication station 22, the timer is activated by the clock section 106 (S105). The clock section 106 measures a predetermined time T from the time when the communication conditions, including the communication station identification data, is requested to the radio communication station 22 to when the waiting for receiving of these communication conditions ends.

Figure 8:
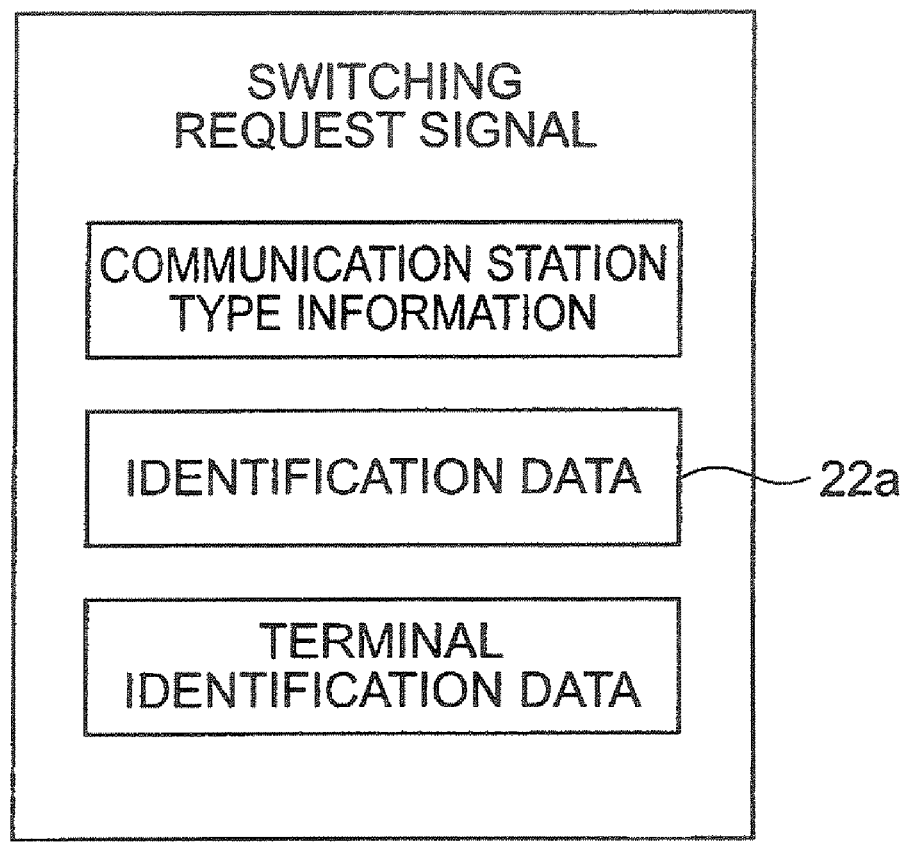
FIG. 8 is a diagram showing the configuration of the switching request signal.

Before this predetermined time T is measured, if the information transmission section 104 receives the communication conditions, including the communication station identification data (S106), the switching request signal is sent to the radio communication station 21 by the first communication section 101 of which receiving function was activated (ON) in the initial status (S101) based on the communication conditions including the communication station identification data received as a result of this inquiry (that is, communication conditions of the radio communication with the radio communication station 22 are good) (S107, switching request step). This signal which requests to select and switch to the second communication section 102 as a communication section in a status where the receiving function is activated includes the identification data 22a of the radio communication station 22, the communication station identification data to indicate the type of the radio communication station 22 and the terminal identification data which can uniquely identify the mobile terminal 1 (see FIG. 8). In other words, the switching request signal includes the connection enabling conditions for a radio communication station which can connect and communicate with the mobile terminal 1 (that is, the radio communication station 22).

Figure 9:
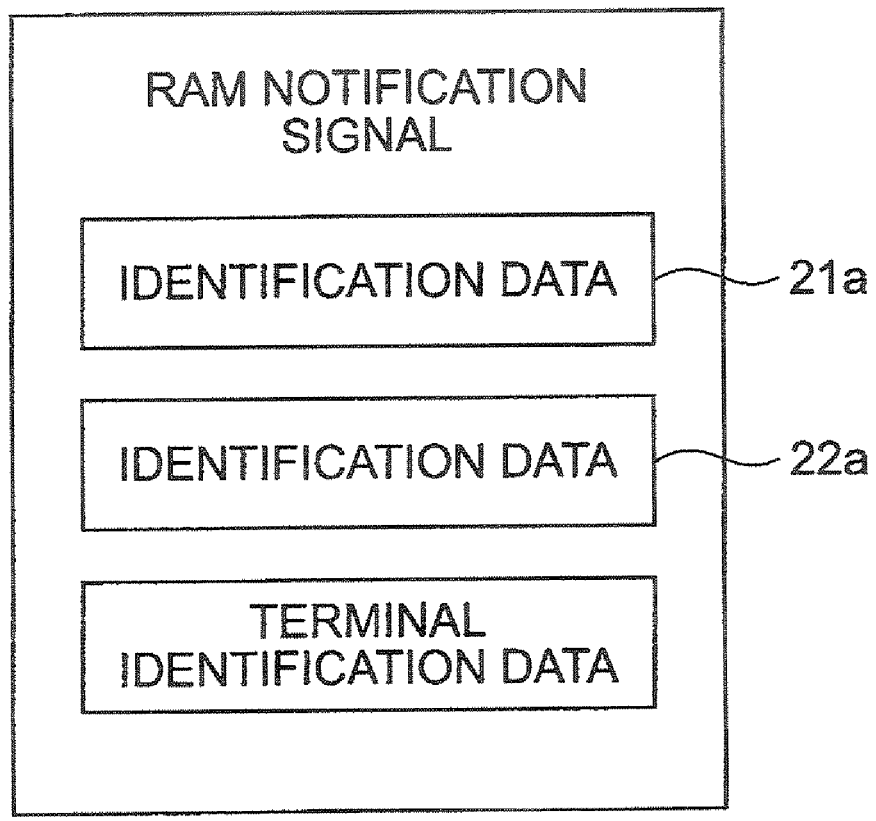
FIG. 9 is a diagram showing the configuration of the RAM notification signal.

Then in the radio communication station 21 which received the switching request signal, the RAM notification signal is sent and notified to the resource allocation manager 4 by the information notification section 21b (S108). This signal includes the identification data 21a of the radio communication station 21, identification data 22a of the radio communication station 22, and terminal identification data which can uniquely identify the mobile terminal 1 (see FIG. 9). In other words, the RAM notification signal includes the connection enabling conditions (e.g. identification data 21a) on a radio communication station which can connect and communicate with the mobile terminal 1 (that is, radio communication station 22).

Then in the resource allocation manager 4 which received the RAM notification signal, the selection switching section 46 refers to the communication station management table 41a using the identification data 21a and identification data 22a included in the RAM notification signal as a key (based on the identification data 21a and identification data 22a) (S109), and determines the MAC address of the radio communication station 21 and radio communication station 22 respectively. Then using these MAC addresses, the resource allocation manager 4 sends a switching instruction signal to the radio communication station 21 and the radio communication station 22 respectively (S110). This switching instruction signal includes the information for changing a communication station which performs radio communication with the mobile terminal 1 from the radio communication station 21 to the radio communication station 22.

Then the radio communication station 21, which received the switching instruction signal, disconnects the session with the mobile terminal 1. At the same time with this disconnection of the session, the radio communication station 22, which received the switching instruction signal, establishes the session with the mobile terminal 1 and sends the receiving signal to the mobile terminal 1 (S111). Here in the mobile terminal 1 which received the receiving signal, the user of the mobile terminal 1 judges whether this receiving is responded to. A case of the user responding to the receiving will be described below. In order to respond to the receiving, the user operates the operation section of the mobile terminal 1 (e.g. pressing a predetermined button of the mobile terminal 1). This leads a response signal to be sent to the radio communication station 22 (S112).

Then a connection for communication, such as a voice call, is enabled between the radio communication section 22 which received the response signal and the mobile terminal 1 which sent the response signal (S113). In other words, the second communication section 102 is selected and switched to as a communication section where the receiving function is in activated status. Here the receiving function of the communication section corresponding to a radio communication station which was not selected by the switching request section 105 (that is, first communication section 101) is deactivated by the release section 107, and becomes deactivated status (S114).

Now the functional effects of the present embodiment will be described. According to the mobile terminal 1 of the present embodiment, the second receiving function of the second communication section 102 is activated by the receiving activation section 103 when the first information is received by the first communication section 101. Then when the second receiving function is activated by the receiving activation section 103, the terminal identification data of the mobile terminal 1 is sent by the information transmission section 104 to a radio communication station that can connect and communicate with the local terminal (that is, radio communication station 22). Then the first or second communication section is selected as a communication section for receiving information sent by the radio communication station 22 which received the terminal identification data from the information transmission section 104 by the switching request section 105 based on the terminal identification data, and a receiving function to be activated is switched.

Therefore after the second receiving function of the second communication section 102 is activated, a communication section is selected and switched based on the inquired communication conditions, so an opportunity of radio communication under good communication conditions is not missed. Also only the first communication section 101 or a communication section switched to by the switching request section 105 (that is, radio interface 11b or 11c out of the second communication section 102) is in a state where the receiving function is in activated status before and after the first information is received by the first communication section 101. Therefore power consumption can be decreased compared with a communication device in which all the radio interfaces (that is, all communication sections) are activated. As a result, the standby time of the mobile terminal 1 can be sustained to a time equivalent to the continuous standby time of a communication device in which only a single radio interface is activated.

Second Embodiment

Figure 10:
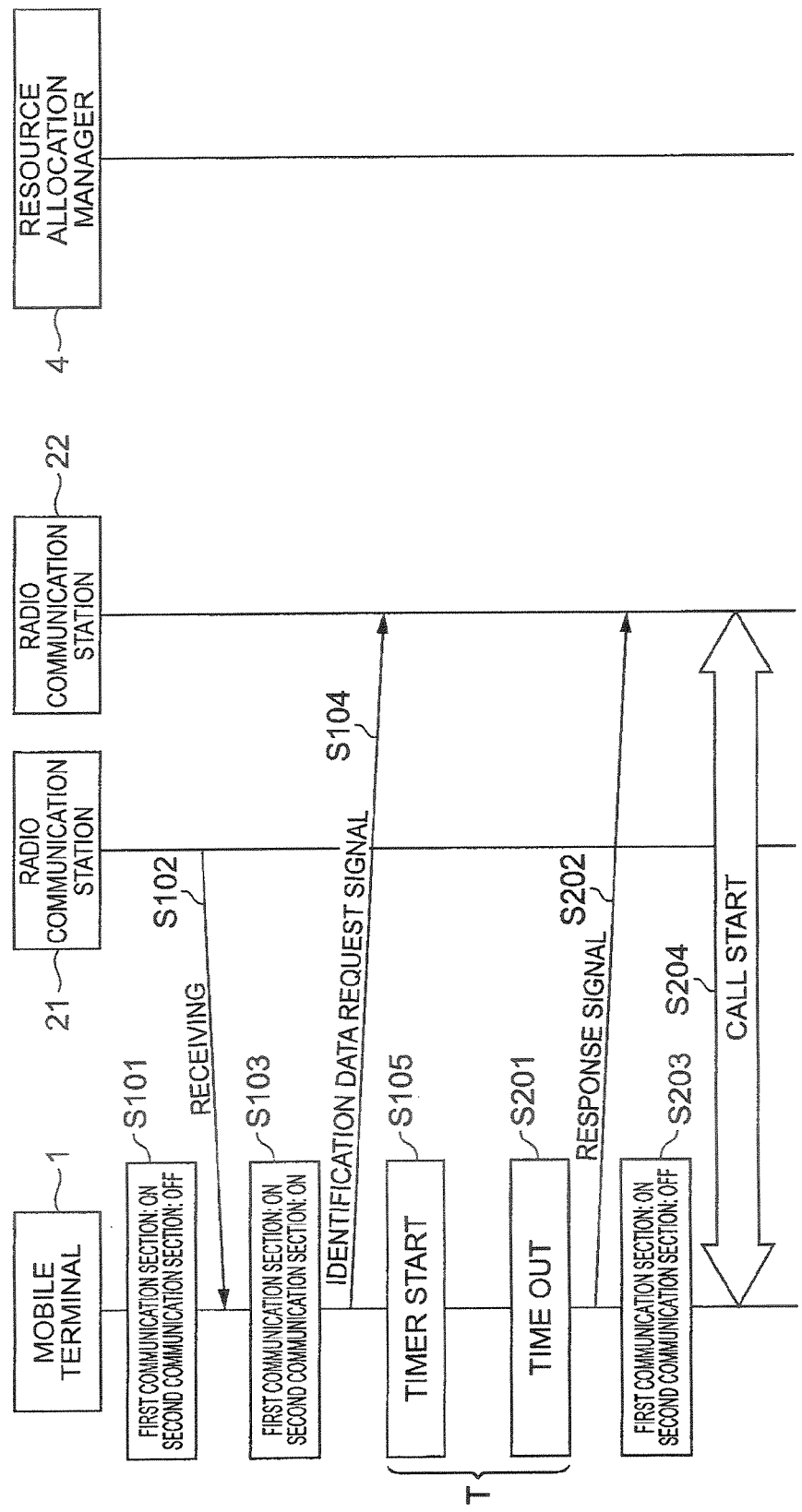
FIG. 10 is a sequence diagram showing an example of the switching operation of the communication section by the communication control system.

A communication control system including the mobile terminal 1 and the resource allocation manager 4 according to the second embodiment of the present invention will now be described with reference to FIG. 10. FIG. 10 is a sequence diagram showing an example of a communication section switching operation by the communication control system. The sequence diagram of the second embodiment is a sequence diagram in the case when the information transmission section 104 did not receive the communication conditions before the above mentioned predetermined time T is measured by the clock section 106 and time out occurs (S201). If the communication conditions are not received in this way, this can be regarded that the radio communication station 22 does not exist in the communication area of the mobile terminal 1, and the mobile terminal 1 is outside the communication area of the radio communication station 22. Therefore this information is notified in response from the mobile terminal 1 to the radio communication station 21 (S202), and the release section 107 deactivates the second receiving function to be in deactivation status (S203). By this, the sequence returns to initial status, and communication connection, such as a voice call, is enabled between the radio communication station 21 and the mobile terminal 1 (S204).

Now the functional effects of the present embodiment will be described. According to the mobile terminal 1 of the present invention, if the mobile terminal 1 is at a location outside the communication area of the radio communication station 22 corresponding to the second communication section 102 in which the receiving function is activated, this receiving function can be immediately deactivated, so the power consumption of the mobile terminal 1 is further decreased, and the continuous standby time of the mobile terminal 1 can be further increased.

Third Embodiment

Figure 11:
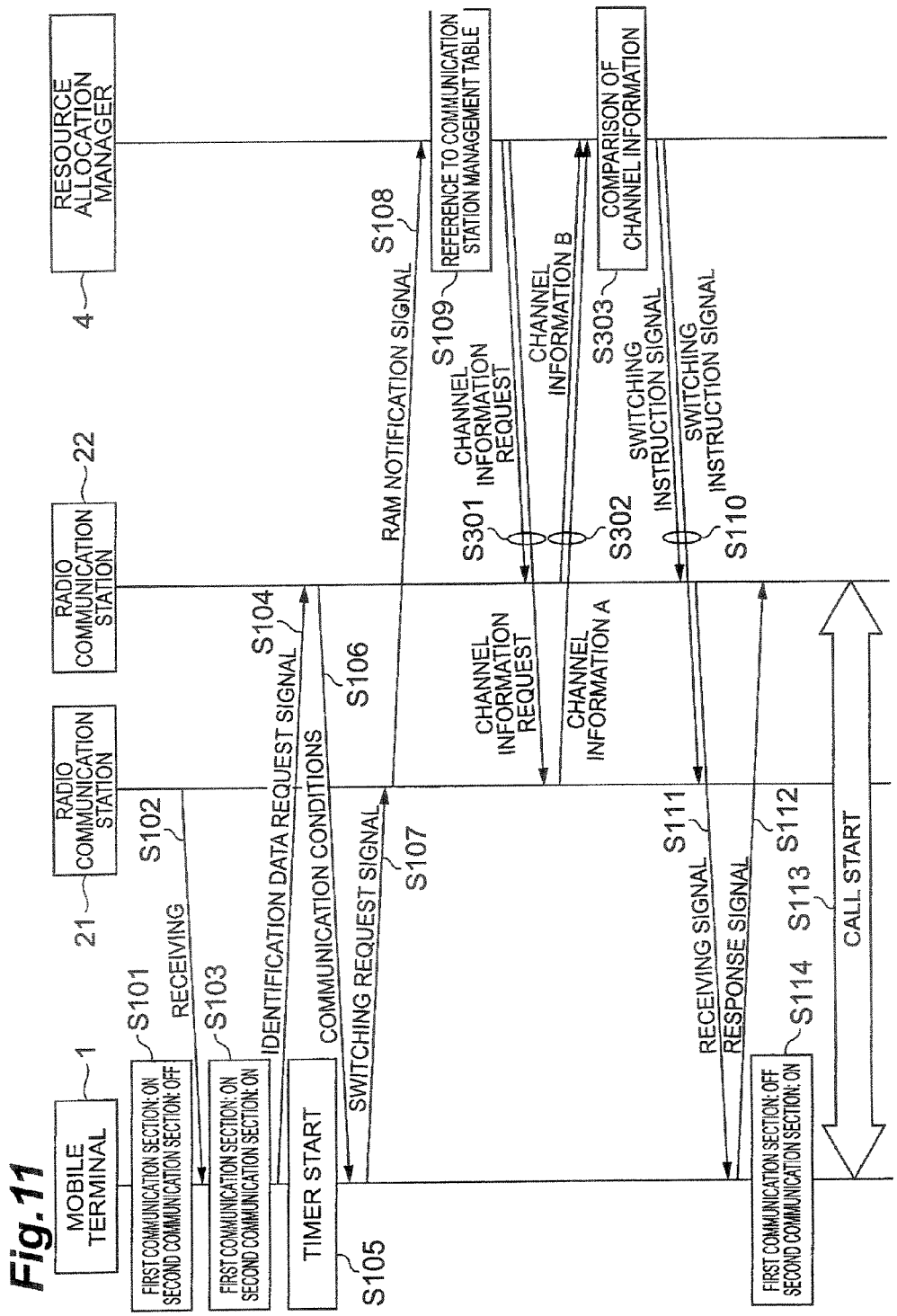
FIG. 11 is a sequence diagram showing an example of the switching operation of the communication section by the communication control system.

A communication control system, including the mobile terminal 1 and the resource allocation manager 4 according to the third embodiment of the present invention, will be described with reference to FIG. 11. FIG. 11 is a sequence diagram showing an example of a communication section switching operation by the communication control system. In the third embodiment, in the resource allocation manager 4 which received the RAM communication signal, the RAM notification signal, including the connection enabling conditions sent from the radio communication station 21 which received the switching request signal including the connection enabling conditions, is received by the information receiving section 45 (S108).

Then in the resource allocation manager 4 which received the RAM notification signal, the selection switching section 46 refers to the communication station management table 41a using the identification data 21a and identification data 22a included in the RAM notification signal as a key (based on the identification data 21a and identification data 22a) (S109), and determines the MAC addresses of the radio communication station 21 and radio communication station 22 respectively. And using these MAC addresses, the status inquiry section 47 of the resource allocation manager 4 sends a channel information request signal to inquire the communication status to the radio communication station 21 and radio communication station 22 respectively (S301). Each of the radio communication station 21 and radio communication station 22 which received this channel information request signal sends the channel information, including the communication status, to the resource allocation manager 4 (S302).

Figure 12:
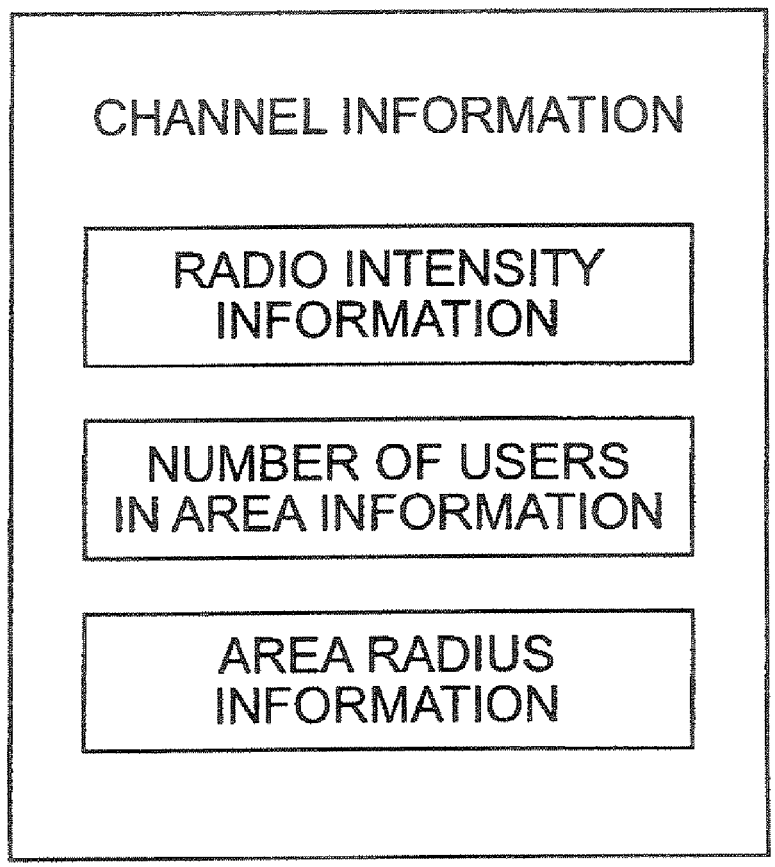
FIG. 12 is a diagram showing the configuration of the channel information.

This channel information includes the radio wave intensity information of the signal which the mobile terminal 1 notified to each of the radio communication stations, information on the number of users physically in the area of each of the radio communication stations, and the area radius information of each of the radio communication stations (see FIG. 12). The resource allocation manager 4 which received the channel information compares the channel information from the radio communication station 21 and that from the radio communication station 22 (S303), and sends the switching instruction signal to the radio communication station 21 and the radio communication station 22 respectively based on the comparison result of the channel information and the RAM notification signal (S110). Hereafter the sequence is the same as the first embodiment.

Now the functional effects of the present embodiment will be described. The selection switching section 46 selects and switches the radio communication station 21 or radio communication station 22 as a radio communication stations which connects and communicates with the mobile terminal 1 based on the comparison result of the communication status (channel information) inquired by the status inquiry section 47 and he terminal identification data received by the information receiving section 45. By this, an opportunity of radio communication under good communication conditions, including good communication status, is not missed more certainty. As a result, an optimum communication environment can always be provided to the user of the mobile terminal 1.

Also based on the connection enabling conditions received by the information receiving section 45, a radio communication station which connects and communicates with the mobile terminal 1 is selected and switched by the selection switching section 46. Therefore an opportunity of radio communication under good communication conditions is not missed more certainty.

Fourth Embodiment

Figure 13:
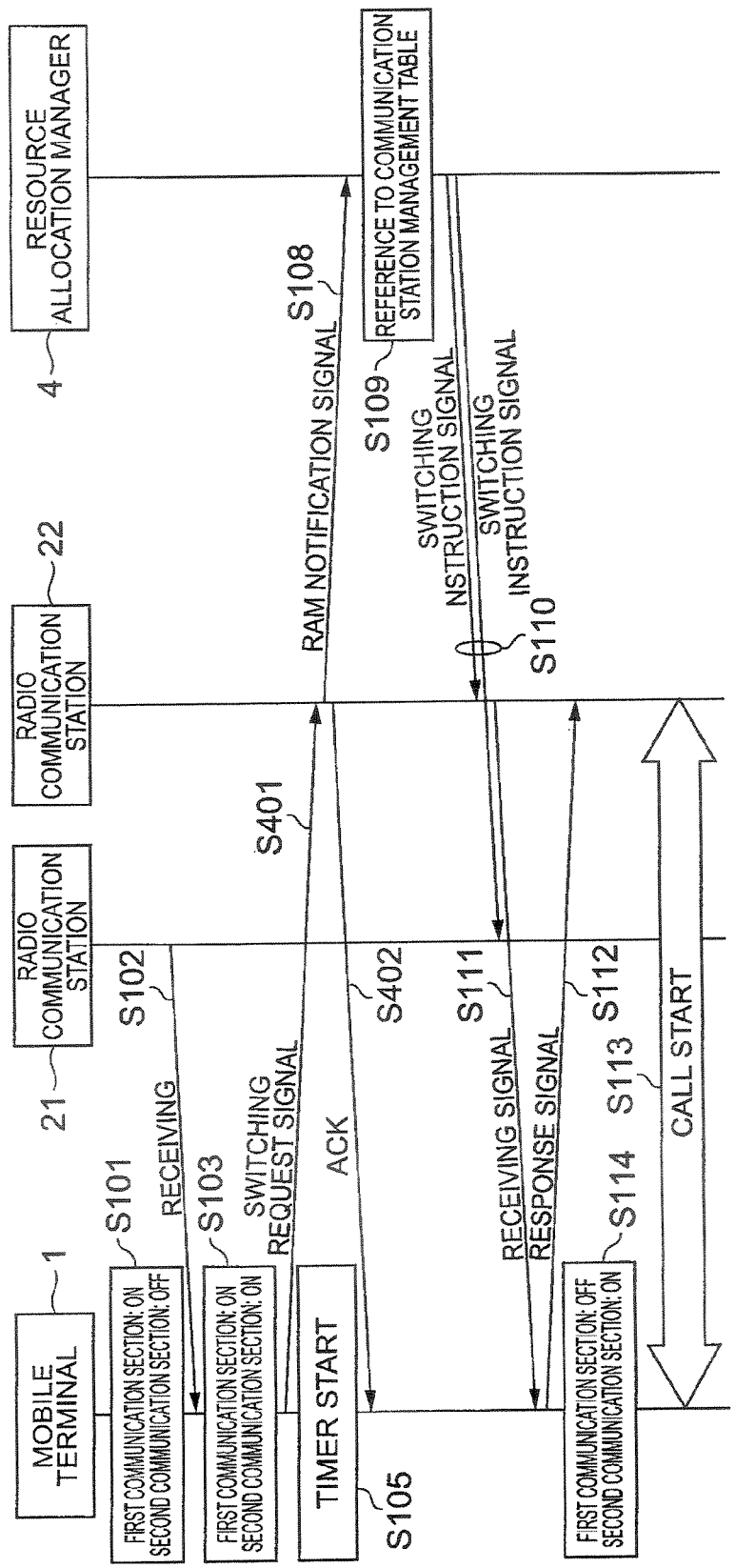
FIG. 13 is a sequence diagram showing an example of the switching operation of the communication section by the communication control system.

A communication control system including the mobile terminal 1 and the resource allocation manger 4 according to the fourth embodiment of the present invention will be described with reference to FIG. 13. FIG. 13 is a sequence diagram showing an example of a connection section switching operation by the communication control system. In the fourth embodiment, after the receiving function of the second communication section 102 is activated by the receiving activation section 103 (S103), the mobile terminal 1 sends a switching request signal to the radio communication station 22 (S401). Here this switching request signal includes the information shown in FIG. 8, as mentioned above. The radio communication station 22 receives this switching request signal, then sends the RAM notification signal to the resource allocation manager 4 (S108). At the same time, with the RAM notification signal, the radio communication station 22 sends the receiving confirmation signal (ACK) to the mobile terminal 1 (S402). The operation after the transmission of the RAM notification signal (S108) is the same as the sequence shown in FIG. 6.

Now the functional effects of the present embodiment will be described. According to the present embodiment, the procedure sending the switching request signal to the radio communication station 21 shown in the first embodiment can be omitted. This leads the load of the mobile terminal 1 to be decreased.

Fifth Embodiment

Figure 14:
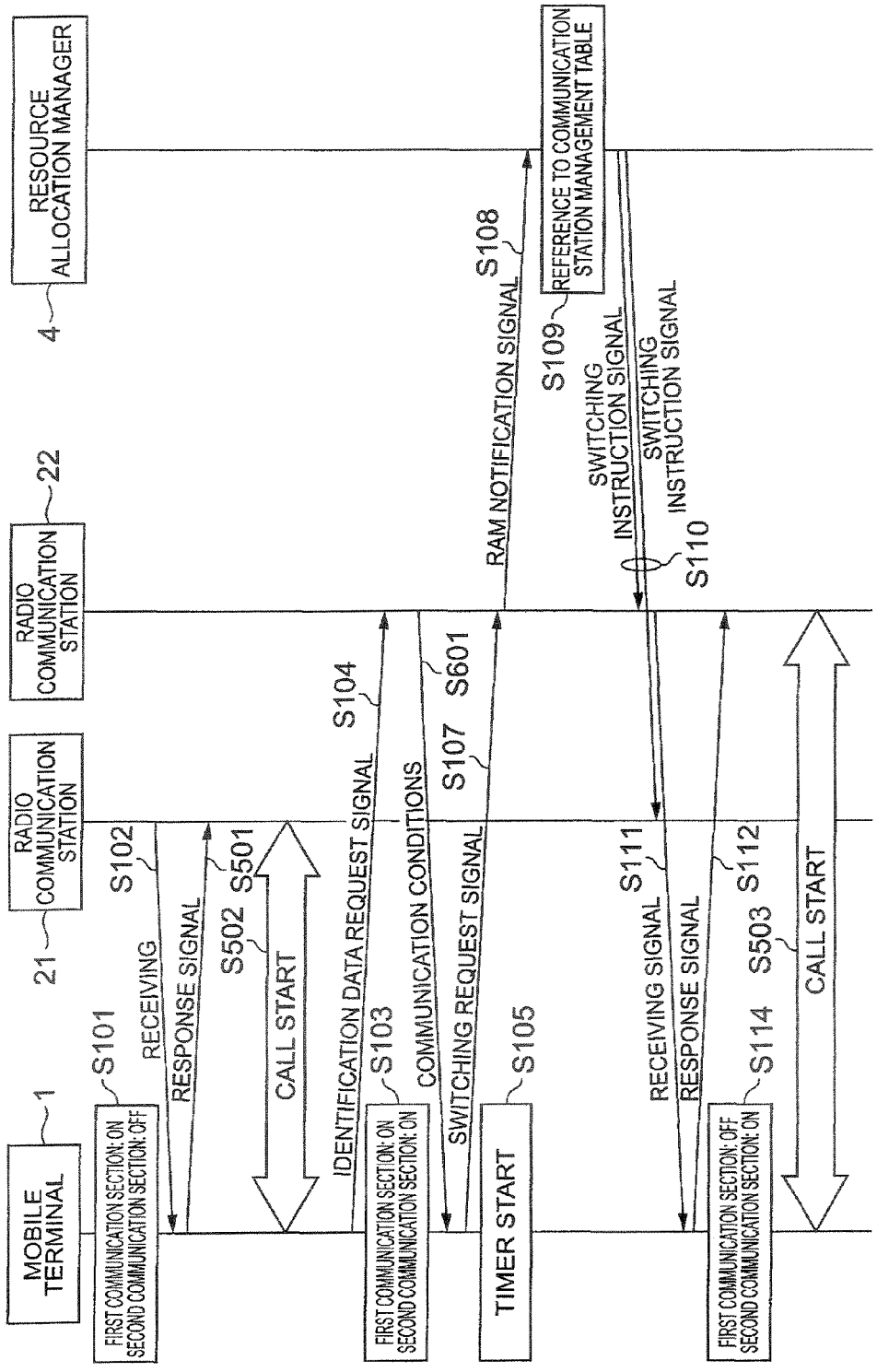
FIG. 14 is a sequence diagram showing an example of the switching operation of the communication section by the communication control system.

Now a communication control system, including the mobile terminal 1 and the resource allocation manager 4 according to the fifth embodiment of the present invention, will be described with reference to FIG. 14. FIG. 14 is a sequence diagram showing an example of a communication section switching operation by the communication control system. In the fifth embodiment after the first communication section 101 accepts receiving from the radio communication station 21 (S102), the mobile terminal 1 responds to the radio communication station 21 (S501), then the communication connection, such as a voice call, is enabled between the radio communication station 21 which received the response signal and the mobile terminal 1 which sent the response signal (S502).

And after this communication connection is completed, the mobile terminal 1 sends the identification data request signal to the radio communication station 22 (S104) while communication continues. Then the information transmission section 104 receives the communication conditions from the radio communication station 22 (S106). The switching request signal is sent to the radio communication station 21 by the first communication section 101 (S107), and the timer is activated by the clock section 106 (S105). Just like the sequence diagram in FIG. 6, steps S108-S112 are executed.

Here after step S112 is executed, the session established between the mobile terminal 1 and the radio communication station 21 is switched to the session established between the mobile terminal 1 and the radio communication station 22 (voice call enabling step). Then the call enabled status is continued even after the communication section of which receiving function is in activated status (that is, the second communication section 102) is selected and switched to (call continuation enabling step).

Now the functional effects of the present embodiment will be described. According to the present embodiment, even after the communication section of which receiving function is in activated status (that is, the second communication section 102) is selected and switched to by the receiving activation step, the voice call using the mobile terminal 1 is enabled by the voice call enabling step. As a result, a standby time (latency) from the receiving of the first information by the first communication section 101 of the mobile terminal 1 to the call enabled status can be decreased. Even after a communication section of which receiving function is in activated status (that is, the second communication section 102) is selected and switched to by the switching request step, the call enabling step is continued in the call continuation enabling step. As a result, an opportunity of a voice call under good communication conditions is not missed.

Embodiments of the present invention were concretely described above, but the present invention is not limited to these embodiments, but can be modified in various ways. The above embodiments and variant forms shall not limit the scope of the present invention, and an expert skilled in the art could develop the embodiments and variant forms within the subject matter of the Claims of the present invention. For example, an integrated server integrating the resource allocation manager 4 and the radio communication station 21 may be provided instead of the resource allocation manager.

What is claimed is:

1. A mobile terminal which can connect and communicate with a plurality of different types of radio communication stations, comprising:
   a first receiving unit configured to receive first information when a first receiving function for receiving the first information from a first radio communication station is activated, and disable receiving of the first information when the first receiving function is deactivated;
   a second receiving unit configured to receive second information when a second receiving function for receiving the second information from a second radio communication station is activated, and disable receiving of the second information when the second receiving function is deactivated;

a receiving activation unit configured to activate the second receiving function of the second receiving unit as a result that the first information is received by the first receiving unit;

an information transmission unit configured to transmit terminal identification data of the mobile terminal to a radio communication station which can connect and communicate with the mobile terminal only when the second receiving function is activated by the receiving activation unit; and a switching request unit configured to select the first or second receiving unit as receiving unit for receiving information transmitted from a radio communication station which has received the terminal identification data by the information transmission unit based on the terminal identification data, and switch a receiving function to be activated.

2. The mobile terminal according to claim 1, wherein the information transmission unit is configured to transmit an inquiry to the second radio communication station about the communication station identification data of the second radio communication station as a result that the second receiving function is activated by the receiving activation unit, select the first or second radio communication station as a radio communication station which can connect and communicate with the mobile terminal based on the inquired communication station identification data, and send the terminal identification data.

3. A resource allocation manager for switching a radio communication station, which connects and communicates with the mobile terminal according to claim 1, and for managing allocation of resources, comprising:

an information receiving unit configured to receive the terminal identification data from the radio communication station when the information transmission unit sends the terminal identification data to a radio communication station which can connect and communicate with the mobile terminal; and a selection switching unit configured to select the first or second radio communication station as a radio station which connects and communicates with the mobile terminal based on the terminal identification data received by the information receiving unit.

4. The resource allocation manager according to claim 3, further comprising:

a status inquiry unit configured to transmit an inquiry to each of the first and second radio communication stations about a communication status after the terminal identification data is received by the information receiving unit, wherein the selection switching unit is configured to select the first or second radio communication station as a radio communication station which connects and communicates with the mobile terminal based on a comparison result of the communication status inquired by the status inquiry unit and the terminal identification data received by the information receiving unit.

5. A communication control method for controlling communication connection between a mobile terminal including a first receiving unit for receiving first information when a first receiving function for receiving the first information from a first radio communication station is activated and disabling receiving of the first information when the first receiving function is deactivated, and a second receiving unit for receiving second information when a second receiving function for receiving the second information from a second radio communication station is activated and disabling receiving of the second information when the second receiving function is deactivated, and a plurality of different types of radio communication stations, the method comprising:

activating the second receiving function of the second receiving unit when the first information is received by the first receiving unit of the mobile terminal;

transmitting terminal identification data of the mobile terminal to a radio communication station which can connect and communicate with the mobile terminal only when the second receive function is activated by the receiving activation step;

selecting the first or second receiving unit as receiving unit for receiving information transmitted by a radio communication station which received the terminal identification data in the information transmission step, based on the terminal identification data; and switching the receiving function to be activated.

6. The communication control method according to claim 5, wherein transmitting terminal identification data includes transmitting an inquiry to the second radio communication station about communication station identification data of the second radio communication station as a result that the second receiving function is activated, and selecting the first or second radio communication station as a radio communication station which can connect and communicate with the mobile terminal based on the inquired communication station identification data, and sending the terminal identification data.

7. The communication control method according to claim 5, further comprising:

switching the mobile terminal to be in a call enabled status enabling a voice call using the mobile terminal after the second receiving function of the second receiving unit is activated; and continuing the call enabled status in the voice call even after the first or second receiving unit is selected and a receiving function to be activated is switched.

8. The mobile terminal according to claim 1, wherein the receiving activation unit is configured to deactivate the second receiving unit if a response to the transmission of the terminal identification data is not received within a predetermined period of time.

9. The mobile communication method according to claim 5, further comprising:

deactivating the second receiving unit if a response to the transmission of the terminal identification data is not received within a predetermined period of time.

* * * * *